US007444739B2

(12) United States Patent
Feldbaum et al.

(10) Patent No.: US 7,444,739 B2
(45) Date of Patent: Nov. 4, 2008

(54) METHOD FOR FABRICATING IMPROVED SENSOR FOR A MAGNETIC HEAD UTILIZING REACTIVE ION MILLING PROCESS

(75) Inventors: Michael Feldbaum, San Jose, CA (US); Wipul Pemsiri Jayasekara, Los Gatos, CA (US); Mustafa Michael Pinarbasi, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 479 days.

(21) Appl. No.: 11/095,979

(22) Filed: Mar. 30, 2005

(65) Prior Publication Data
US 2006/0218776 A1    Oct. 5, 2006

(51) Int. Cl.
*G11B 5/187*    (2006.01)
*C23F 1/12*    (2006.01)

(52) U.S. Cl. ............... 29/603.15; 29/603.12; 29/603.16; 29/603.14; 29/603.18; 360/314; 360/324; 204/192.34; 216/48; 216/66

(58) Field of Classification Search ............... 29/603.12, 29/603.13, 603.14, 603.15, 603.16, 603.18; 360/314, 324; 216/48, 66; 204/192.34; 427/131, 249.7
See application file for complete search history.

(56) References Cited
U.S. PATENT DOCUMENTS

| 4,357,369 | A | * | 11/1982 | Kilichowski et al. | ...... 216/48 X |
| 4,791,719 | A | * | 12/1988 | Kobayashi et al. | ........ 216/48 X |
| 5,018,037 | A | | 5/1991 | Krounbi et al. | ............. 360/113 |
| 5,790,351 | A | | 8/1998 | Suzuki | ........................ 360/113 |
| 6,315,875 | B1 | | 11/2001 | Sasaki | .................. 204/192.34 |
| 6,385,017 | B1 | | 5/2002 | Min et al. | ............... 360/324.12 |
| 6,493,926 | B2 | | 12/2002 | Han et al. | ................. 29/603.14 |
| 2004/0103524 | A1 | | 6/2004 | Breyta et al. | ............. 29/603.03 |
| 2004/0105191 | A1 | | 6/2004 | Min et al. | ................. 360/324.1 |
| 2004/0106295 | A1 | | 6/2004 | Cyrille et al. | ................ 438/692 |

(Continued)

FOREIGN PATENT DOCUMENTS

JP        8-7224    *    1/1996

OTHER PUBLICATIONS

Matsuo et al., "Sub-Micron GMR Sensors with Vertically Integrated Hard Magnet Biasing Applicable for High Temperature Operation", IEEE Transactions on Magnetics, Vo. 37, No. 4, pp. 2001-2003, Jul. 2001.*

*Primary Examiner*—A. Dexter Tugbang
(74) *Attorney, Agent, or Firm*—Robert O. Guillot; Intellectual Property Law Offices

(57) ABSTRACT

A magnetic head fabrication process in which a stencil layer is deposited upon a plurality of sensor layers. A photoresist mask in the desired read track width is fabricated upon the stencil layer. A reactive ion milling step is then conducted to remove the unmasked portions of the stencil layer. Where the stencil layer is composed of an organic compound, such as Duramide and/or diamond-like-carbon, a reactive ion milling step utilizing oxygen species produces a stencil of the present invention having exceptionally straight side walls with practically no undercuts. Thereafter, an ion milling step is undertaken in which the sensor layers that are not covered by the stencil are removed. The accurately formed stencil results in correspondingly accurately formed side walls of the remaining central sensor layers. A magnetic head sensor structure having a desired read track width and accurately formed side walls is thus fabricated.

5 Claims, 4 Drawing Sheets

U.S. PATENT DOCUMENTS

| | | |
|---|---|---|
| 2004/0109265 A1 | 6/2004 | Gill .................. 360/324.12 |
| 2004/0121185 A1 | 6/2004 | Fukuzawa et al. .......... 428/692 |
| 2004/0160709 A1 | 8/2004 | Lin et al. ............... 360/324.12 |

* cited by examiner

METHOD FOR FABRICATING IMPROVED SENSOR FOR A MAGNETIC HEAD UTILIZING REACTIVE ION MILLING PROCESS

BACKGROUND OF THE INVENTION

1. Field of the Invention

The present invention relates generally to methods for fabricating a magnetic head read sensor, and more particularly to the use of a reactive ion milling process step to accurately fabricate a stencil for subsequently fabricating the central read sensor element of a magnetic head.

2. Description of the Prior Art

Magnetic heads for hard disk drives include a read sensor that detects data bits formed on a rotating hard disk. The data bits are written in narrow data tracks, and the read sensor is formed with a corresponding read track width for accurately reading the data bits in the data track. As the data areal storage density of hard disks increases, the data track width necessarily becomes narrower and the read track width of the magnetic head sensors must correspondingly decrease to properly read data from the narrower data track.

The standard method for fabricating a magnetic head sensor involves the deposition of a plurality of sensor layers upon a substrate, followed by the masking of desired portions of the sensor layers with a stencil or mask of the desired read track width. Thereafter, an ion milling step is conducted in which the stencil shields the desired central sensor layer portions and the unshielded sensor layer portions are removed. The fabrication of the stencil is therefore a significant step in the subsequent fabrication of the sensor. As the data track width of hard disks has decreased, necessitating a corresponding decrease in the read track width of the magnetic head sensor, the accurate fabrication of the sensor stencil has become an even more significant factor in the ion milling process that forms the sensor. It is therefore desirable to develop a sensor stencil fabrication process that accomplishes the creation of a more accurate stencil, such that magnetic heads having a narrow read track width can be accurately fabricated.

SUMMARY OF THE INVENTION

In the magnetic head fabrication process of the present invention a stencil layer is deposited upon a plurality of sensor layers that will comprise the sensor structure. A photoresist mask in the desired read track width is fabricated upon the stencil layer. A reactive ion milling step is then conducted to remove the unmasked portions of the stencil layer. Where the stencil layer is composed of an organic compound, such as Duramide and which may also include a diamond-like-carbon (DLC) sublayer, a reactive ion milling step utilizing oxygen species from an oxygen containing gas such as oxygen, carbon dioxide, carbon monoxide or others produces a stencil of the present invention having exceptionally straight side walls with practically no undercuts. Thereafter, a standard ion milling step is undertaken in which the sensor layers that are not covered by the stencil are removed. The accurately formed stencil of the present invention results in correspondingly accurately formed side walls of the remaining central sensor layers. As a result, a magnetic head sensor structure having a desired read track width and accurately formed side walls is fabricated. Subsequent magnetic head fabrication steps, as are well known to those skilled in the art, are then conducted towards the ultimate fabrication of the magnetic head.

It is an advantage of the method for fabricating a magnetic head of the present invention that an improved sensor stencil is provided for fabricating an improved magnetic head sensor.

It is another advantage of the method for fabricating a magnetic head of the present invention that a Duramide stencil is fabricated upon the sensor layers utilizing a reactive ion milling process.

It is a further advantage of the method for fabricating a magnetic head of the present invention that the process steps for fabricating the sensor stencil and the process steps for subsequently fabricating the central sensor element can be performed sequentially in the same ion milling fabrication chamber.

It is yet another advantage of the method for fabricating a magnetic head of the present invention that magnetic heads having a narrower, more accurately formed read track width can be fabricated.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIG. 5 is identical to FIG. 1 and is provided for ease of comprehension of the method of the present invention;

DETAILED DESCRIPTION OF THE PREFERRED EMBODIMENTS

As is well known to those skilled in the art, the read sensor of a magnetic head is a small structure that is comprised of several layers of materials. One of the most critical dimensions of the sensor is the width of the central portion of the sensor because it defines the read track width of the magnetic head. As efforts are made to increase the areal data storage density of hard disk drives, the read track width of the sensor is correspondingly reduced, such that the smaller data bits can be accurately sensed. As is described in detail hereinbelow, the side walls of the sensor which define its read track width must be accurately formed in order to create reliable sensors, and as the read-track width of the sensor is reduced, the significance of accurately formed sensor side walls is increased.

As is described in detail herebelow, in the prior art the read sensor is formed by initially fabricating a stencil upon a plurality of sensor layers. This is followed by an ion milling process that removes sensor layer material that is not covered by the stencil such that sensor side walls are created. Therefore, a key to the accurate fabrication of the sensor side walls is the accurate fabrication of the stencil. The present invention is therefore directed to a method for more accurately fabricating the sensor stencil, such that a sensor with more accurately fabricated sensor side walls can subsequently be created. The prior art stencil and sensor fabrication process is first described in order to provide a more complete understanding of the present invention.

Figure 1:
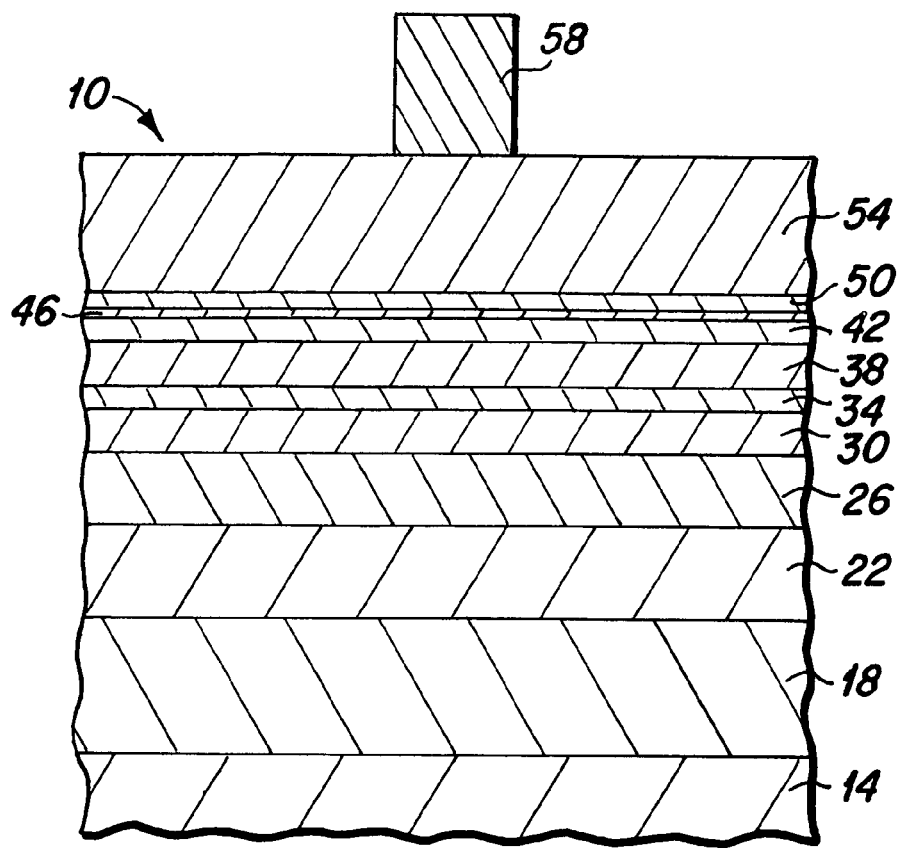
FIG. 1 is a side cross-sectional view depicting a prior art fabrication step of a sensor device having a stencil layer and photoresist mask structure shown thereon.
Figure 2:
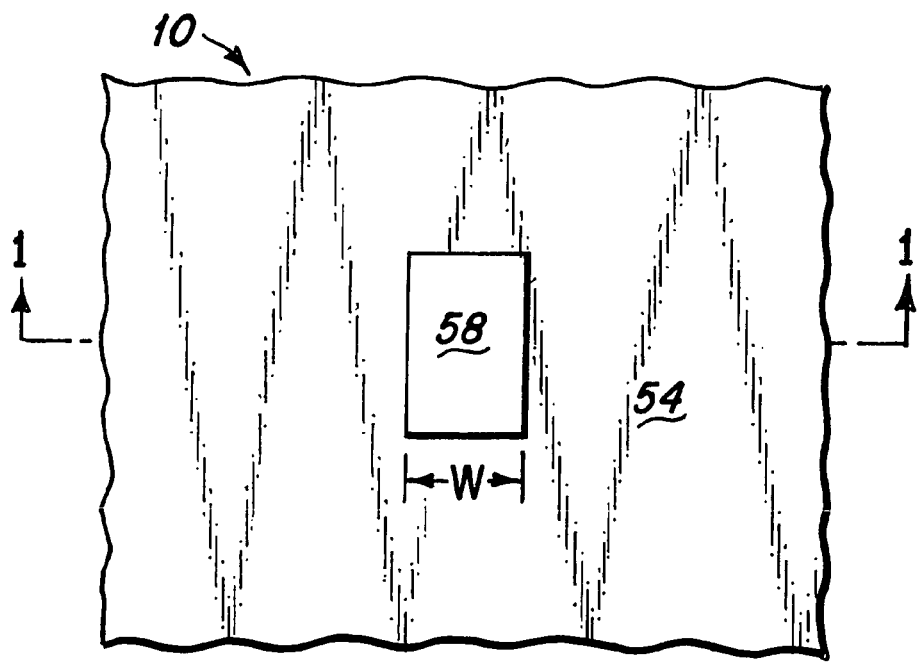
FIG. 2 is a top plan view depicting the prior art sensor device of FIG. 1, wherein section lines 1-1 are provided to show the relationship between FIGS. 1 and 2.

FIGS. 1 and 2 depict an initial process step in the fabrication of a prior art stencil for a magnetic head sensor, wherein FIG. 1 is a side cross-sectional view and FIG. 2 is a top plan view having section lines 1-1 to facilitate an understanding of the relationship of FIGS. 1 and 2. As depicted in FIGS. 1 and 2, a typical magnetic head read sensor 10 includes a plurality of thin film layers that are deposited upon a surface of a substrate 14. These layers may include a first magnetic shield layer 18 that is deposited upon the surface of the wafer substrate 14, an insulation layer 22, an antiferromagnetic layer 26, a pinned magnetic layer 30, a spacer layer 34, a free magnetic layer 38, and a cap layer 42.

It is to be understood that this generalized sensor layer description is provided for purposes of illustration. As is known to those skilled in the art, many differing types of sensors exist having these or other layers deposited in the same or different sequences, where the individual layers are composed of a plurality of materials. As the present invention involves the fabrication of the sensor stencil (as is described herebelow), all such differing sensor layers and structures are included within the contemplation and scope of the present invention.

Following the deposition of the sensor layers, protective layers are deposited, and such protective layers may include an initial, thin silicon layer 46, which serves as a base for a diamond-like-carbon (DLC) layer 50. This DLC layer 50 is provided to protect the sensor layers in a subsequent chemical mechanical polishing (CMP) fabrication step that is undertaken at a later point in the fabrication of the sensor.

A sensor stencil layer 54 is next deposited upon the DLC layer 50. In the prior art, as in the present invention, the stencil layer 54 may be comprised of an organic compound such as Duramide, a trademark of Cambrex Corporation, East Rutherford, N.J. Where a typical DLC layer 50 may be approximately 100 Å thick, a typical Duramide stencil layer 54 is approximately 1200 Å thick. Following the fabrication of the Duramide layer 54, a photoresist stencil mask 58 is photolithographically formed upon the Duramide layer 54. In fabricating the photoresist mask 58, a photoresist layer is formed across the surface of the Duramide layer 54, followed by well known photolithographic steps which culminate in the fabrication of the photoresist mask elements 58 and the removal of the remaining portions of the photoresist layer. As is best seen in the top plan view of FIG. 2, the photoresist mask 58 may be generally rectangular, having a narrow width dimension W which corresponds to the desired read track width, of the read head sensor.

Figure 3:
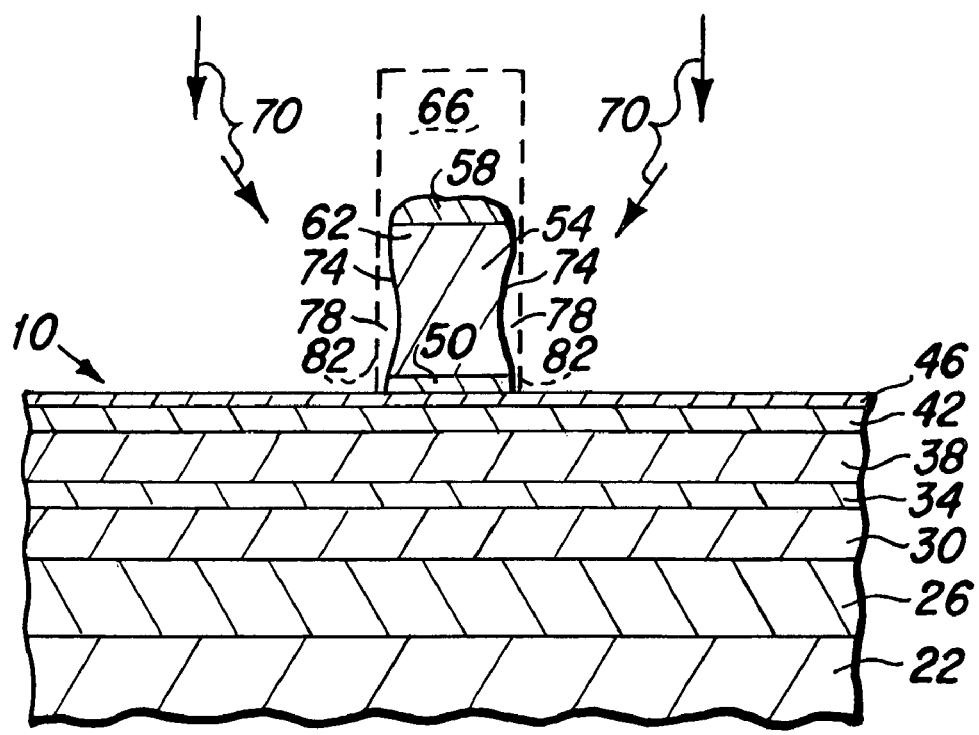
FIG. 3 is a side cross-sectional view depicting a prior art reactive ion etch (RIE) fabrication step for the prior art sensor device depicted in FIGS. 1 and 2.

As is depicted in FIG. 3, the photoresist mask 58 is now utilized to form the Duramide stencil 62, where the photoresist mask is shown in phantom 66 in FIG. 3 for purposes of comprehension. In the prior art process depicted in FIG. 3, a reactive ion etch (RIE) process step (represented as arrows 70) is conducted, to remove the Duramide that is not covered by the photoresist mask 58. The RIE process utilizes oxygen reactive species and is conducted at a rather large bias voltage of approximately 560 volts. Additionally, in the RIE process the ion source is positioned close to the substrate, and a high plasma density and high pressure are utilized, all resulting in a significant divergence of species from a straight line. This creates an aggressive RIE removal of the unmasked Duramide and DLC layers, which typically takes approximately 15 to 25 seconds of processing time.

A problem that can result from such an aggressive RIE process step, particularly where the process happens so quickly, is that a desired end point of the RIE step is difficult to determine. The end point is typically determined utilizing an OES (Optical Emission Spectroscope) device which may be set to detect silicon as an indication that an end point of the RIE etching through the DLC layer is reached. However, due to the extreme speed of the RIE process and the divergence of etching species, significant overetching into the side walls of the Duramide stencil typically occurs in the time period it takes to conduct an OES end point determination. As a result, the RIE step of the prior art is typically conducted for a time period that takes it beyond the desired end point. As a result of the aggressiveness, the divergence of species, and lack of directionality of the prior art RIE process, the side walls 74 of the Duramide stencil are formed with unwanted striations and typically become undercut 78. That is, material is removed from within the desired nearly vertical (slightly outwardly sloped) side walls 82 depicted in phantom in FIG. 3. The pattern on a processed wafer therefore suffers stencil track width non-uniformity either from run to run or within same wafer. The undercut side walls 74, with striations and non-uniformities of the Duramide stencil 62 can then have unwanted adverse effects on the fabrication of the sensor, as is next depicted with the aid of FIG. 4.

Figure 4:
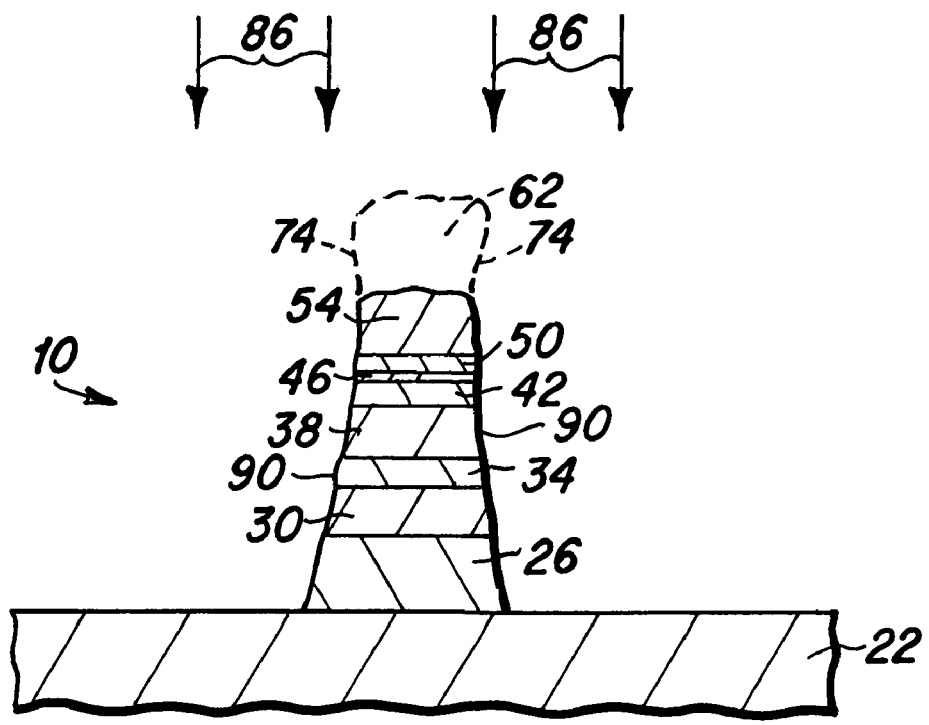
FIG. 4 is a side cross-sectional view depicting an ion milling step for the prior art sensor device depicted in FIG. 3.

FIG. 4 is a side cross-sectional view depicting the fabricated central sensor layer structure of a prior art read head sensor 10, where the previously created sidewalls 74 of the Duramide stencil 62 are shown in phantom. In fabricating the central sensor element, an ion milling process (represented as arrows 86) is conducted, typically using argon species. While the argon ion milling process is typically very directional, due to the undercuts 78 in the Duramide stencil sidewalls 74, the side walls 90 of the central sensor element 94 are shielded from the ion milling, resulting in the generally uneven side walls depicted in FIG. 4. While this unevenness in the side walls 90 has not been a significant problem in prior art sensor fabrication, due to the comparatively large read track width of the sensor, in current magnetic heads, having a narrower read track width, the unevenness in the sensor side walls 90 has become problematical. As is next described, the present invention provides improved sensor side wall fabrication through the creation of an improved Duramide stencil, having improved stencil side walls. The stencil fabrication process of the present invention is next described.

Figure 5:
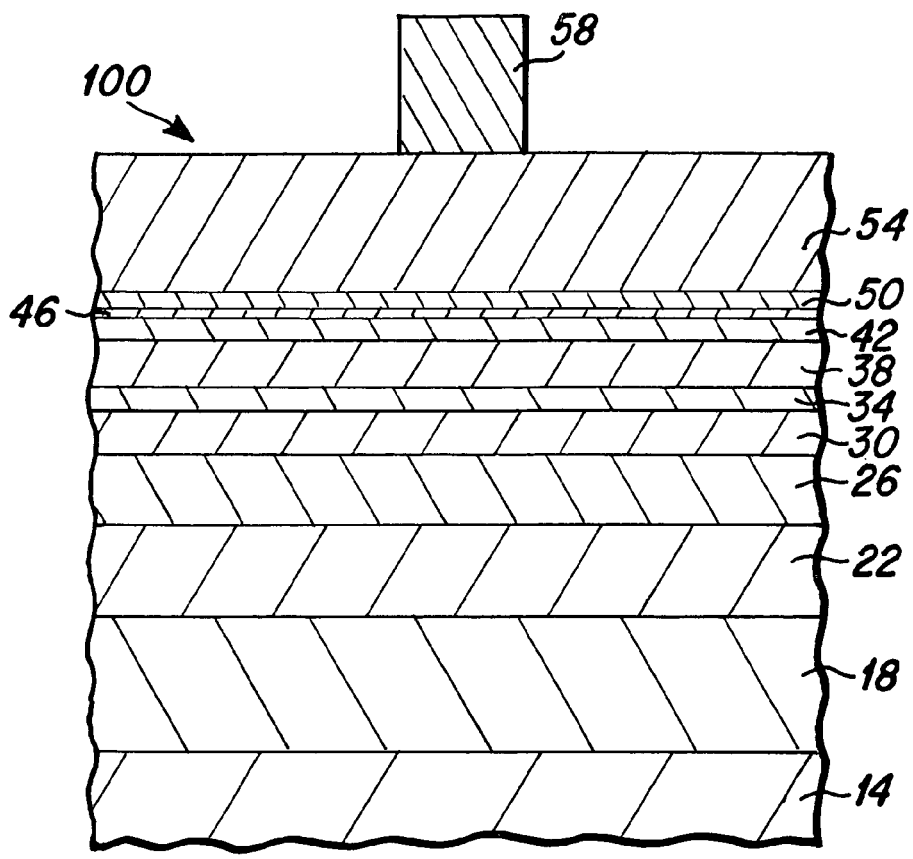
FIG. 5 is a side cross-sectional view depicting the prior art sensor device with a stencil layer and photoresist mask structure fabricated thereon, where

For ease of comprehension, FIG. 5 depicts an initial step in the sensor stencil fabrication method of the present invention, where FIG. 5 is identical to FIG. 1. The magnetic head 100 of the present invention of FIG. 5 therefore has identical initial structures to those of FIG. 1, and the identical structures are identically numbered for ease of comprehension. Therefore, as is seen in FIG. 5, and has been described hereabove with regard to FIGS. 1 and 2, a photoresist mask 58 is first photolithographically created upon the Duramide stencil layer 54.

Figure 6:
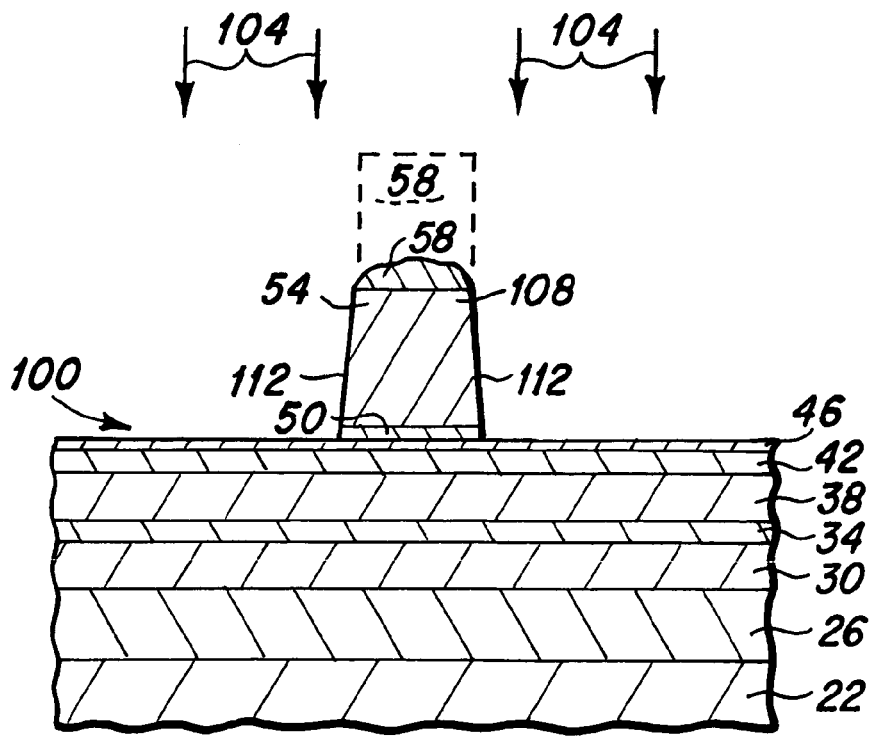
FIG. 6 is a side cross-sectional view depicting the reactive ion milling step of the present invention for fabricating the sensor stencil of the present invention.

Following the photolithographic fabrication of the photoresist mask 58, the Duramide stencil fabrication process of the present invention is undertaken. Specifically, in the present invention, as depicted in FIG. 6 a reactive ion milling process (represented as arrows 104) is undertaken to create the Duramide stencil 108. This is to be distinguished from the prior art reactive ion etching (RIE) process described hereabove. In the reactive ion milling process of the present invention, a reactive species such as oxygen species, which may also include a small percentage of non-reactive argon species is utilized to mill away the unmasked portions of the Duramide layer 54 and the DLC layer 50 down to the silicon layer 46. This reactive oxygen species may be obtained from an oxygen containing gas such as oxygen, carbon dioxide, carbon monoxide, or another known oxygen containing gas. Reactive species other than oxygen which may be used in a suitable reactive ion milling step are also within the contemplation of the present invention. In the preferred embodiment, the reactive ion milling tool includes an ion collimation system with the ability to collimate the ion species onto a grounded substrate with almost zero degrees of divergence. Utilizing a distant plasma source (as compared to an RIE tool) and a significantly reduced pressure and plasma density, the collimated, ion species provide a significantly lower milling rate of the Duramide and DLC as compared to the prior art RIE tool. The particular operational parameters of the ion milling tool utilized in the present invention are generally prescribed by the tool manufacturer, and as such, are utilized in the ion milling step of the present invention.

The reactive ion milling process is slower than the prior art reactive ion etching process and typically takes more than approximately 1½ minutes to complete, as compared to the prior art 15 to 25 seconds. This increase in process time is desirable in that it accommodates a more accurate end point detection. That is, there is sufficient time for the OES end point detector to detect silicon species that indicate that the DLC layer has been milled. The reactive ion milling process can then be halted with minimal undercutting of the Duramide stencil side walls 112. Additionally, the reactive ion milling process of the present invention is more directional than the reactive ion etching process of the prior art. Specifically, although the oxygen species of the reactive ion milling process is reactive with the organic Duramide layer 54 and the DLC layer 50, because the reactive ion milling process is less aggressive than the reactive ion etching process, there is no significant undercutting of the Duramide side walls 112 where the reactive ion milling process of the present invention is performed. As a result, as depicted in FIG. 6, the reactive ion milling process of the present invention results in the creation of a Duramide stencil 108 having practically straight side walls 112 with practically no undercutting. After the Duramide 108 stencil of the present invention is created, a standard ion milling process step then is conducted to fabricate an improved central sensor element for a magnetic head, as is next described with the aid if FIG. 7.

Figure 7:
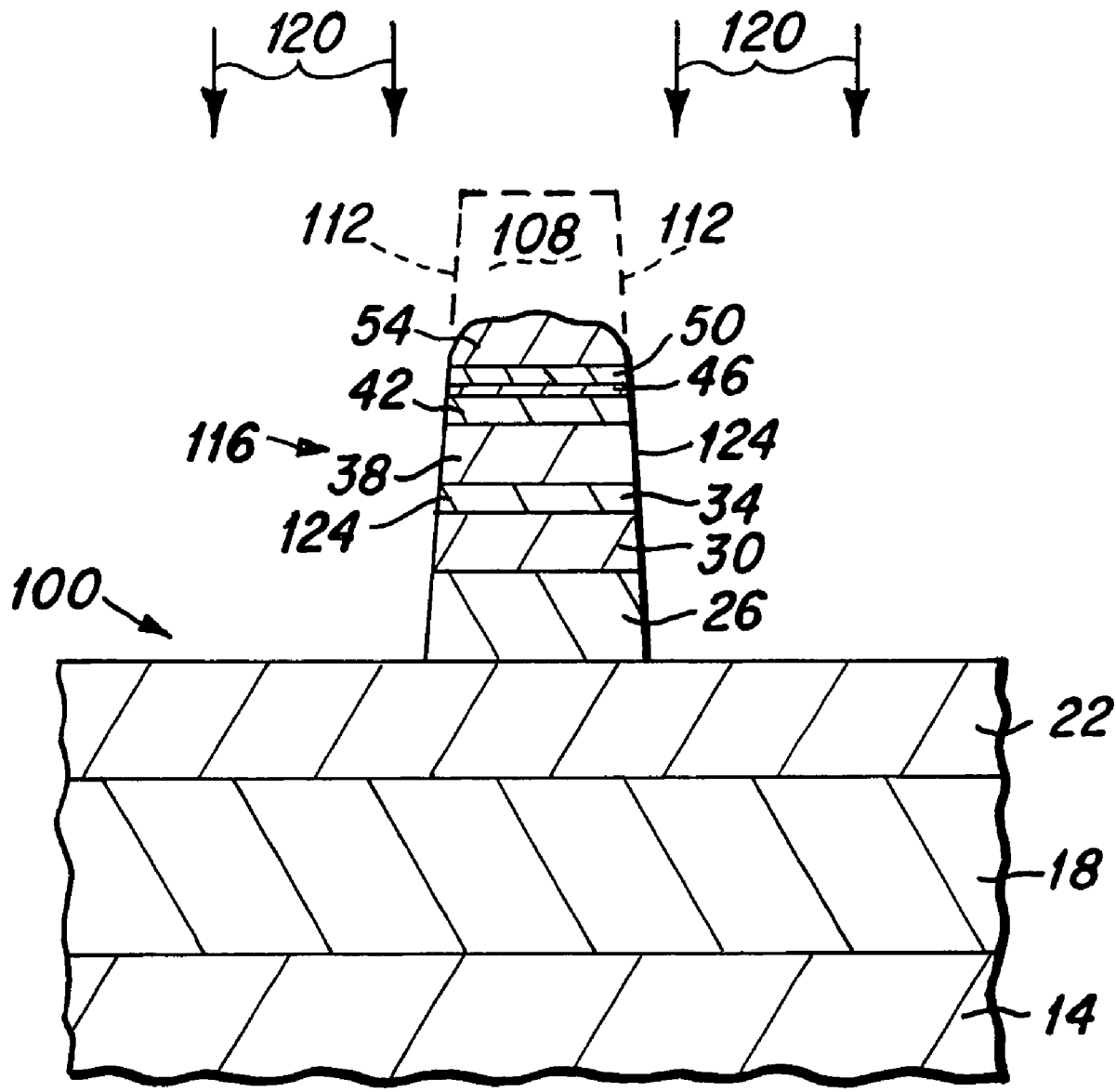
FIG. 7 is a side cross-sectional view depicting the sensor ion milling step which results in an improved magnetic head sensor.

FIG. 7 is a side cross-sectional view depicting the fabrication of a central sensor element 116 utilizing a stencil 108 that is fabricated in accordance with the present invention. As depicted in FIG. 7, an ion milling process (represented as arrows 120), such as is practiced in the prior art, utilizing argon species, is next performed to remove unmasked sensor layer material. The ion milling is quite directional, and owing to the straight side walls 112 (shown in phantom in FIG. 7) of the Duramide stencil 108, the side walls 124 of the central sensor element 116 are likewise quite straight. Significantly, because the Duramide stencil side walls 112 are quite straight, the read track width W of the sensor element 116 is accurately and repeatably achieved.

It can now be understood that the process of the present invention for fabricating the stencil is a reactive ion milling process, and the process for subsequently fabricating the central sensor is a typical ion milling process. As such, these processes can be conducted sequentially within the same ion milling chamber or device, which constitutes a simplification of the prior art magnetic head fabrication steps. Specifically, where the prior art fabrication process utilizes a reactive ion etching step to form the sensor stencil, the subsequent ion milling step cannot be conducted within the same chamber due to the differing process parameters and constraints of reactive ion etching chambers and ion milling chambers.

As is well known to those skilled in the art, though not depicted herein, following the fabrication of the central sensor element, magnetic hard bias elements and electrical leads are fabricated next to the side walls of the central sensor element. Thereafter, a chemical mechanical processing (CMP) liftoff process is performed, in which any remaining Duramide stencil 54 is removed down to the DLC layer 50. Further well known process steps are then taken towards the completion of the fabrication of the magnetic head.

It is therefore to be understood that a significant feature of the present invention is the utilization of a reactive ion milling process, utilizing oxygen or other reactive species with perhaps a small component of argon species, to fabricate the Duramide stencil that is subsequently utilized in an ion milling process for the creation of the central sensor element. Generally, the fabrication method of the present invention may be utilized to fabricate central sensor elements where a stencil layer is susceptible to reactive ion milling, and stencil layers comprised of materials other than Duramide, but which are susceptible to reactive ion milling, are therefore to be included within the scope of the present invention.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A method for fabricating a read sensor for a magnetic head, comprising:
   depositing a plurality of sensor layers upon a substrate;
   depositing a plurality of stencil layers upon said sensor layers, said stencil layers including a silicon layer that is deposited upon said sensor layers, a diamond-like-carbon layer that is deposited upon said silicon layer, and an organic compound layer that is deposited upon said DLC layer;
   fabricating a photoresist mask upon said stencil layer;
   fabricating a sensor stencil upon said sensor layers utilizing a reactive ion milling process step to remove material of the stencil layers down into said silicon layer that is not covered by said photoresist mask, wherein said reactive ion milling process step utilizes oxygen species and argon species;
   fabricating a sensor structure comprised of said sensor layers utilizing an ion milling process step to remove sensor layer material that is not covered by said sensor stencil.

2. A method for fabricating a read sensor for a magnetic head as described in claim 1 wherein said organic compound layer is approximately 1,200 Å thick.

3. A method for fabricating a read sensor for a magnetic head as described in claim 1 wherein said reactive ion milling process step is conducted for approximately 1 ½ minutes.

4. A method for fabricating a read sensor for a magnetic head as described in claim 1 wherein said diamond like-carbon layer is approximately 100 Å thick.

5. A method for fabricating a read sensor for a magnetic head as described in claim 1 wherein said ion milling process step is conducted in a same chamber as said reactive ion milling process step.

* * * * *